United States Patent
Giesler

(10) Patent No.: US 6,762,683 B1
(45) Date of Patent: Jul. 13, 2004

(54) TAG DEVICE

(75) Inventor: Thomas Giesler, Hamburg (DE)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/691,810

(22) Filed: Oct. 19, 2000

(30) Foreign Application Priority Data

Oct. 26, 1999 (DE) .......................................... 199 51 378

(51) Int. Cl.[7] .......................................... G08B 13/14
(52) U.S. Cl. ............................ 340/572.8; 340/572.1; 340/572.6; 340/572.7; 235/451; 235/449; 235/383; 343/741; 343/779
(58) Field of Search ............................ 340/572, 572.8, 340/572.1, 572.6, 572.7; 235/451, 449, 383, 385, 487; 343/741, 742, 779

(56) References Cited

U.S. PATENT DOCUMENTS

| | | | | |
|---|---|---|---|---|
| 5,175,418 A | * | 12/1992 | Tanaka | 235/439 |
| 5,654,693 A | * | 8/1997 | Cocita | 340/572.1 |
| 5,854,480 A | * | 12/1998 | Noto | 235/492 |
| 6,001,211 A | * | 12/1999 | Hiroyuki | 235/492 |
| 6,040,773 A | * | 3/2000 | Vega et al. | 340/572.1 |
| 6,122,492 A | * | 9/2000 | Sears | 455/127 |
| 6,147,605 A | * | 11/2000 | Vega et al. | 340/572.7 |
| 6,236,316 B1 | * | 5/2001 | Eberhardt et al. | 340/572.7 |
| 6,252,508 B1 | * | 6/2001 | Vega et al. | 340/572 |

FOREIGN PATENT DOCUMENTS

EP 0585132 A1 3/1994 ........... G01S/13/78

* cited by examiner

Primary Examiner—Jeffery Hofsass
Assistant Examiner—Daniel Previl
(74) Attorney, Agent, or Firm—Kevin Simons

(57) ABSTRACT

A tag device is described for receiving, processing and/or transmitting data signals using an integrated electronic data-processing circuit formed in an essentially plane substrate body and at least two electrodes arranged on the plane substrate body, which electrodes are connected to the data-processing circuit in such a way that they are adapted to transmit and/or receive the data signals and/or electric power supply energy using offset currents produced via a quasi-static, electric alternating field. This tag device is very simple and inexpensive, and has a great reliability of operation. Furthermore, a system with such a tag device and a corresponding reading apparatus are described.

10 Claims, 7 Drawing Sheets

TAG DEVICE

BACKGROUND OF THE INVENTION

The invention relates to a tag device.

DE 196 28 504 A1 discloses a tag device with an integrated circuit capacitively coupled to an antenna, as well as a method of manufacturing such a device. The tag device comprises an integrated circuit, electrode plates in the integrated circuit, an insulating film covering the electrode plates, antenna terminals which face one of the electrode plates, with the insulating film in between, antennas which are connected to the relevant antenna terminals, and enveloping parts. The known tag device stores information, for example, relating to the type and price of a commercial article and transmits an information-based signal as a response to electromagnetic waves received from a sensing device.

A transponder which receives electromagnetic waves from a sensing device via antennas is known from EP 0 585 132 A1 quoted in DE 196 28 504 A1. The reception of electromagnetic waves causes a response circuit of the transponder to supply information as a response to the received waves and to transmit the information via the antennas to the sensing device. The current for the response circuit is supplied by means of the power of the received electromagnetic waves. When the transponder receives the electromagnetic waves from the sensing device with its antennas, a current supply circuit converts the power of the received waves into DC power and feeds it to the response circuit so that this circuit is switched on The response circuit demodulates a signal received from the sensing device, analyzes this signal and then supplies information stored in the response circuit. The output signal of the response circuit is applied to the antennas via a coupling capacitor. The sequence of information is transmitted via the antennas to the sensing device.

The response circuit and the current supply circuit as described in EP 0 585 132 A1 are formed on a semiconductor chip in the form of a generally flat integrated circuit. The integrated circuit is connected to the antennas by means of wires. Each antenna also has a generally flat form and extends in a plane outwards, comprising the flat integrated circuit. The overall integrated circuit including the antennas is positioned with its oppositely located main faces between two envelopes by which it is encapsulated. The envelopes are formed from a synthetic material and also have a flat shape. The resultant construction constitutes a tag device which can be provided on, for example, a commercial article so as to transmit information to a sensing device.

In the tag device known from EP 0 585 132 A1, the wires and antennas and the wires and the terminals of the integrated circuit are connected by means of wire contacts. These are liable to connection defects due to blows or shocks and require great precision in their manufacture.

In the tag device described in DE 196 28 504 A1, these wire contacts are replaced by an antenna in the tag device described in this specification, while a generally flat electrode plate is arranged on a main surface of the integrated circuit in the tag device and is connected to the response circuit of the tag device. A generally flat antenna terminal is connected to the antenna and faces the electrode plate by a predetermined distance. A capacitance by which the antennas are electrically coupled to the integrated circuit, is formed between the antenna terminal and the facing electrode plate.

SUMMARY OF THE INVENTION

It is an object of the invention to provide a simplified and low-cost tag device.

This object is solved by a tag device for receiving, processing and/or transmitting data signals by means of an integrated electronic data-processing circuit formed in an essentially plane substrate body and at least two electrodes arranged on the plane substrate body, which electrodes are connected to the data-processing circuit in such a way that they are adapted to transmit and/or receive the data signals and/or electric power supply energy by means of offset currents produced via a quasi-static, electric alternating field.

The invention further provides a system using a tag device for receiving, processing and/or transmitting data signals by means of an integrated electronic data-processing circuit formed on a substantially plane substrate body and at least two electrodes arranged on the plane substrate body of the tag device, as well as a reading apparatus comprising electrodes corresponding to the electrodes of the tag device, in which system, in operation, the tag device is brought into a spatial correlation with the reading apparatus in such a way that an exchange of electric power supply energy and/or the data signals takes place between the electrodes of the tag device and the corresponding electrodes of the reading apparatus by means of offset currents produced via a capacitive coupling with a quasi-static, electric alternating field.

The invention also provides a reading apparatus for a system of the above-mentioned type according to the invention.

The tag device according to the invention may be arranged completely on a one-piece substrate body without any additional external components. A semiconductor body may serve as such a substrate body on which or in which the data-processing circuit is formed simultaneously. Conventional semiconductor materials such as silicon or semiconducting compounds but also semiconducting synthetic materials may be used for the semiconductor body. The tag device according to the invention is in direct exchange of electric power supply energy and/or the data signals with corresponding electrodes of a reading apparatus adapted to the tag device via the electrodes which are directly arranged on the substrate body, which electrodes may also be formed by parts of the substrate itself. The coupling required for this exchange is effected capacitively, i.e. by a quasi-static electric field, at very close distances. By avoiding microwaves for the transmission, stray fields are minimized so that the transmission and sensing reliability is increased. In addition to the simplified structure of the tag device according to the invention and the associated reading apparatus, a universal possibility of use is also achieved for applications which are sensitive to security. The tag devices according to the invention may be used as machine-readable and rewritable product tags for storing product information and client service data. They may be further used in tags or stickers for biochemical sample containers, accumulator packets, data storage media and the like. Tag devices according to the invention may be used as security characteristics for, for example, passports, driving licenses or banknotes as a form of forgery protection or they may be used for machine-reading these documents. Due to their very compact structure and very small dimensions, the tag devices according to the invention may also be used as, for example, marks of genuineness for products and works of art. They may be further provided as hidden, secret tags on different parts of vehicles such as motorcars and bicycles on which they serve, for example, as marks of recognition for retrieving stolen goods. Tag devices according to the invention may also be used as inexpensive, electronic tickets with a high protection against forgery.

Due to their simple structure, the tag devices according to the invention can be manufactured at very low cost. The integrated data-processing circuit is preferably made in a standardized CMOS manufacturing process in which the devices, particularly electrodes and associated circuit arrangements are also comprised on the substrate body, without additional, external components. Particularly, no energy store for storing the power supply energy is required. Energy and data exchange is only realized by means of capacitive coupling In such a tag device, the substrate body may have a surface of approximately 1 qmm or less when manufactured on a silicon basis. Since neither connection contacts nor special housings are required for the tag device, the manufacturing costs are very low and are particularly only about 1/10 of the manufacturing costs for microwave-coupled tag devices.

In the tag device according to the invention, at least two of the electrodes may optionally be arranged on that surface of the substrate body on which the data-processing circuit is formed, or at least one of the electrodes may be arranged on this surface and at least a further one may be arranged on a facing surface of the substrate body. Preferably, the material of the substrate body itself serves as this further electrode on the substrate body surface facing the data-processing circuit. Simple adaptations to the desired fields of application are possible by virtue of these variants.

In addition to the direct capacitive coupling between the electrodes of the tag device according to the invention and the electrodes of the reading apparatus, indirect capacitive coupling via at least one auxiliary electrode is also possible in a simple way in the tag devices according to the invention. To this end, a further embodiment of a tag device according to the invention additionally comprises a supporting body comprising at least one auxiliary electrode which is at least essentially plane. The substrate body with the electrodes and the data-processing circuit is arranged on this supporting body in a position in which a capacitive coupling of each auxiliary electrode with at least substantially exclusively one of the electrodes on the substrate body is realized. Without giving up the principle of capacitive coupling in this case, a sufficiently intensive electrostatic coupling may also be achieved with such an arrangement when, for reasons of maintenance, the electrodes of the reading apparatus and the tag device cannot be put close enough together to achieve a sufficient capacitive coupling directly between the reading apparatus and the electrodes on the substrate body. The auxiliary electrodes are put very close to the electrodes on the substrate body in such an arrangement so that a sufficiently high capacitance is obtained in this case. A corresponding, sufficient capacitance should then be established between the electrodes of the reading apparatus and the auxiliary electrodes, for which a plane extension of the auxiliary electrodes dimensioned in accordance with the space to be maintained should be selected. The capacitance between each electrode on the substrate body and the auxiliary electrode, on the one hand, as well as the capacitance between the auxiliary electrode and the electrode of the reading apparatus, on the other hand, are then arranged in series during operation and establish a capacitive coupling between the substrate body and the reading apparatus. To this end, each auxiliary electrode covers the substrate body at least substantially at the area of the electrode on the substrate body, which electrode capacitively couples with said auxiliary electrode.

In a further embodiment of the invention, in which at least one of the electrodes of the tag device is arranged on the surface facing the data-processing circuit on the substrate body, the substrate body with the electrodes arranged thereon and the data-processing circuit is arranged between auxiliary electrodes arranged in two planes. This provides the possibility of a simple coupling of the auxiliary electrodes with the electrodes on the substrate body thus configured.

In a system according to the invention, comprising a tag device of the type described and a reading apparatus, the reading apparatus and the tag device may be preferably formed with mutually complementary, form-locking recesses. These serve for a rapid joining of the reading apparatus and the tag device in the correct position. Such recesses prove to be advantageous because the high positioning accuracy, required for reasons of the small dimensions of the tag device according to the invention, is easily achieved for the coupling to be established between the reading apparatus and the tag device.

Further advantageous embodiments of the invention are defined in the dependent claims.

These and other aspects of the invention are apparent from and will be elucidated with reference to the embodiments described hereinafter.

DESCRIPTION OF THE PREFERRED EMBODIMENT

Figure 1A:
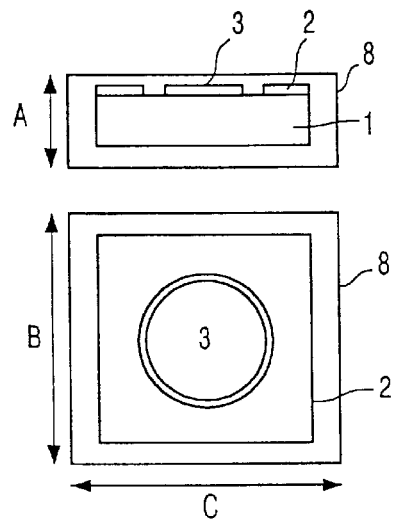
FIG. 1 shows several examples of the construction of a tag device according to the invention.

FIGS. 1 a), b) and c) shows embodiment of a tag device according to the invention, comprising an essentially plane substrate body 1 on which electrodes 2, 3, 4, 5, 6, 7 are arranged. Each FIGS. 1a), b) and c) shows a cross-section in the upper part and a plan view in the lower part of the tag device in accordance with the embodiment shown. In each tag device shown, a data processing circuit is formed in the substrate body 1 directly below the electrodes 2, 3 and 4, 5 and 6, and preferably integrated in a CMOS technique. The substrate body 1 is preferably formed from doped silicon.

However, in a variant, it may also be made of a semiconducting synthetic material.

The electrodes 2, 3 and 4, 5 and 6 arranged directly on the upper side of the substrate body 1 via the data-processing circuit are connected thereto in an electrically conducting manner and have different geometrical shapes. For example, the tag device shown in FIG. 1a) has two concentric electrodes 2, 3 while the tag device shown in FIG. 1b) has two strip-shaped juxtaposed electrodes 4, 5. The tag device shown in FIG. 1c) has a single, continuous electrode 6 on the upper side. Here, the substrate body 1 forms a second electrode 7 on its lower side.

The substrate bodies of the tag devices shown by way of example in FIG. 1, including their electrodes, are enclosed by a protective coating 8 of a synthetic material, preventing electric short-circuits and corrosion. FIG. 1a) also shows, by way of example, the 20 main dimensions of the tag device. In a tag device according to the invention, the thickness A is, for example, less than 100 μm, whereas the width B and the length C may be shorter than 1 mm. Such a miniaturized structure provides the possibility of versatile use of the tag device according to the invention.

Figure 2A:
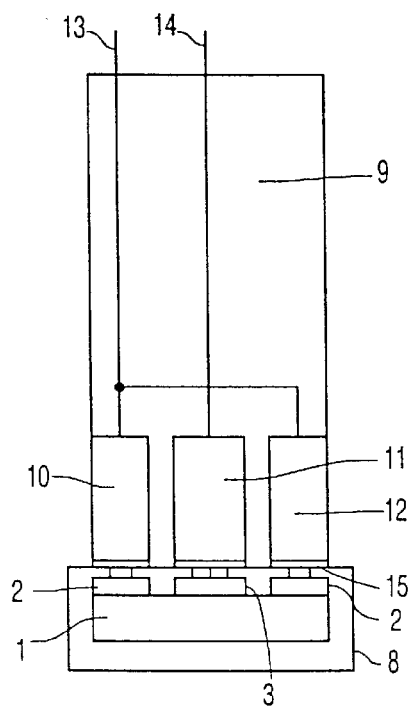
FIG. 2 shows examples for the co-operation of a tag device according to the invention with a reading apparatus.

FIG. 2 shows two embodiments for the co-operation between a tag device according to the invention and an associated reading apparatus. It comprises an arrangement indicated as a reading pencil 9 in which electrodes 10, 11, 12 are formed in an insulating material. This insulating material preferably has a pencil-like form whose tip is adapted to the surface of the substrate body 1 of the tag device and which supports said electrodes 10 to 12. To operate the tag device with the reading apparatus, the tip of the reading pencil 9 and the electrodes 10, 11, 12 accommodated therein is put on the surface of the tag device in such a way that the electrodes 10 to 12 of the reading apparatus are at least in a substantially congruent position with respect to the electrodes of the tag device with which a capacitive coupling is to be built up. In the embodiment shown in FIG. 2, this is represented by means of the tag device of FIG. 1a) with the concentric electrodes 2, 3. The outer electrodes 10, 12 in the reading pencil 9 are electrically interconnected in a corresponding manner. Two electrode terminals 13, 14 are connected to the electrodes 10, 12 and 11 and lead to further, electronic signal-processing elements in the reading apparatus. The reference numeral 15 diagrammatically denotes the electric field lines in FIG. 2a).

Figure 2B:
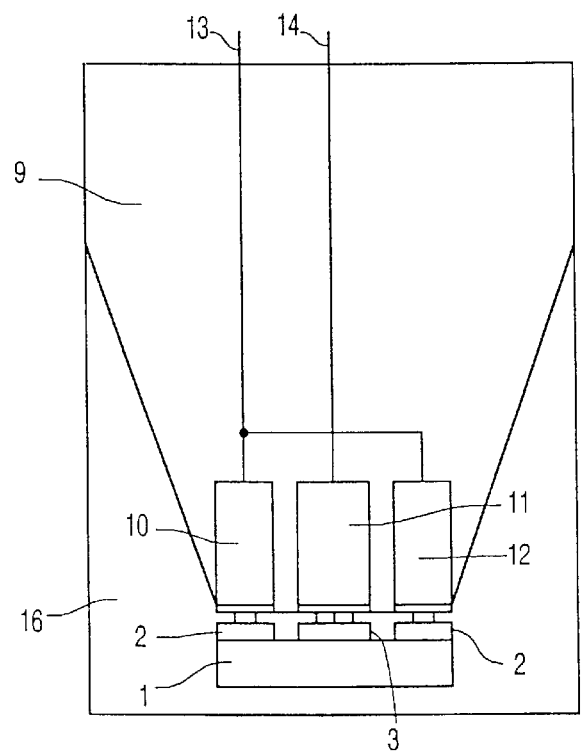

To be able to achieve an accurate position alignment between the tag device and the reading pencil 9 without any elaborate adjustments, the reading pencil 9 in the embodiment shown in FIG. 2b) has a conical recess at the area of the electrodes 10 to 12 which engages a corresponding recess of a housing 16 of the tag device in a form-locking manner. This recess ensures a rapid, precision-fit joining of the reading pencil 9 with the tag device and hence a functionally accurate adjustment of the electrodes 10 to 12 with respect to the electrodes 2, 3. In the embodiment shown in FIG. 2b), the housing 16 also takes over the function of the protective coating 8 of the tag device.

The electrodes 10 to 12 are preferably formed from a conducting polymer. This elastic structure reduces the influence of dirt particles on the surface of the tag device. A punctiform pressure of the reading pencil 9 on the tag device is thereby avoided while, also in the presence of dirt particles, the distance between the electrodes 10 to 12, on the one hand, and 2, 3, on the other hand, is maintained for a reliable functioning because the elastic polymer yields in the area of the dirt particles but further engages the surface of the tag device.

Figure 1B:
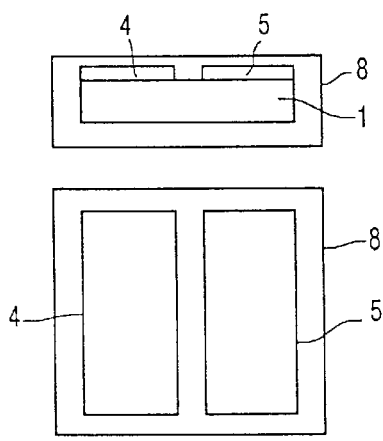
Figure 3:
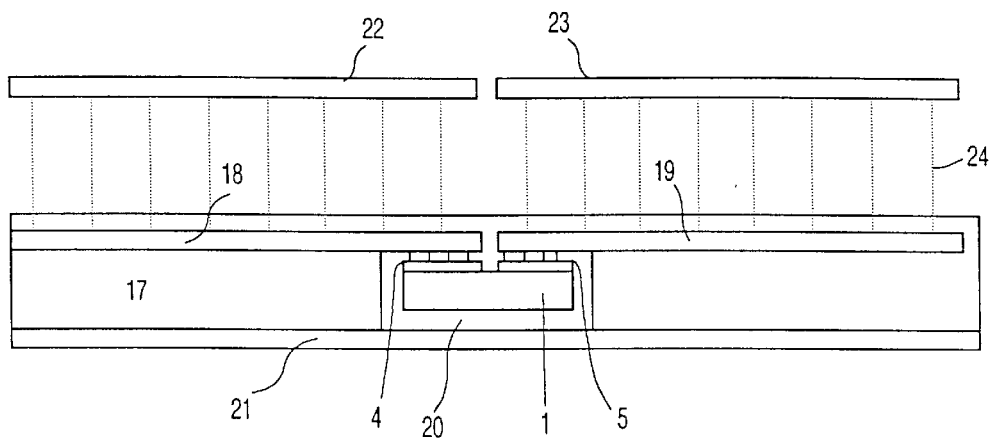
FIG. 3 shows an embodiment of a tag device according to the invention, comprising a supporting element with auxiliary electrodes and their co-operation with a reading apparatus.

FIG. 3 shows an embodiment of the tag device of FIG. 1b) with a supporting body 17 in which two auxiliary electrodes 18, 19 are embedded. The supporting body 17 is made of a foil-like, insulating material and the auxiliary electrodes 18, 19 have a plane structure. The substrate body 1 with the electrodes 4, 5 is embedded in a recess of the supporting body 17 and the recess of the supporting body 17 is filled with an adhesive mass 20 in which the substrate body 1 is embedded. This adhesive mass 20 simultaneously constitutes a dielectric which forms a thin dielectric film between the electrodes 4, 5 on the substrate body 1 and the auxiliary electrodes 18 and 19. A capacitance by which the power supply energy and/or data signals between the auxiliary electrodes 18 and 19 and the data-processing circuit on the substrate body 1 can be transmitted is thereby formed between the electrodes 4, 5 and the auxiliary electrodes 18 and 19. Preferably, the auxiliary electrodes 18, 19 are formed in the area of coverage of the substrate body 1 in such a way that they are congruent at that area with the electrodes 4 and 5. The plane side of the supporting body 17 remote from the auxiliary electrodes 18, 19 is provided with a self-adhesive coating 21 in the embodiment shown in FIG. 3. By means of this self-adhesive coating 21, the tag device can be secured in a very easy and rapid way.

Due to the larger surface of the auxiliary electrodes 18, 19, it is possible to establish a coupling over a larger distance to the reading apparatus via the electric field. Corresponding electrodes 22, 23 of the reading apparatus are shown diagrammatically in FIG. 3; the electric field denoted by field lines 24 is formed between these electrodes 22 and 23 and the auxiliary electrodes 18 and 19. In a modification of the arrangement shown in FIG. 3, the electrodes 22, 23 of the reading apparatus may also be formed concentrically. The auxiliary electrodes 18, 19 are then also formed concentrically. For example, the surface of the auxiliary electrode 18 has a circular segment shape at whose edge the substrate body 1 is placed. The edge of the auxiliary electrode 18 then covers the electrode 4 on the substrate body while the second electrode 5 on the substrate body projects from below the edge of the auxiliary electrode 18. The second auxiliary electrode 19 in the form of a circle is arranged concentrically around the first auxiliary electrode 18, which second auxiliary electrode covers the electrode 5 on the substrate body 1 with its inner edge.

By simply sticking the substrate body 1 below the foil-like supporting body 17 with the auxiliary electrodes 18, 19, a lamination of the substrate body 1 in the supporting body 17 may be dispensed with during manufacture so that a low-cost manufacturing method is obtained.

During operation, distances of several centimeters may be bridged between such a tag device and the read apparatus.

FIG. 4 shows embodiments for the co-operation between a tag device with an electrode 7 on the rear surface, i.e. the surface remote from the data-processing circuit in the substrate body 1. The reading pencil 9 now only accommodates an electrode 11 with an electrode terminal 14 which couples via the electric field 15 with the electrode 6 on the upper side of the substrate body 1 along which the data-processing circuit is arranged. The current circuit for the coupling is closed via an electric field indicated by electric field lines 25 between the electrode 7 on the rear side of the substrate body 1 and the ground potential surrounding the overall arrangement, to which also the reading apparatus is connected. The electrode 11 is again preferably made of a conducting polymer.

Figure 4A:
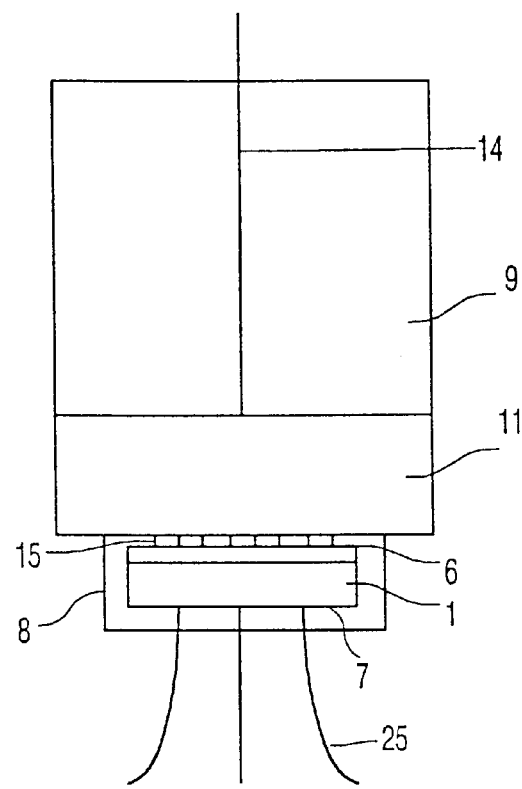
FIG. 4 shows examples of the co-operation of the reading apparatus with the tag device in the case of a two-sided arrangement of electrodes on the tag device.
Figure 4B:
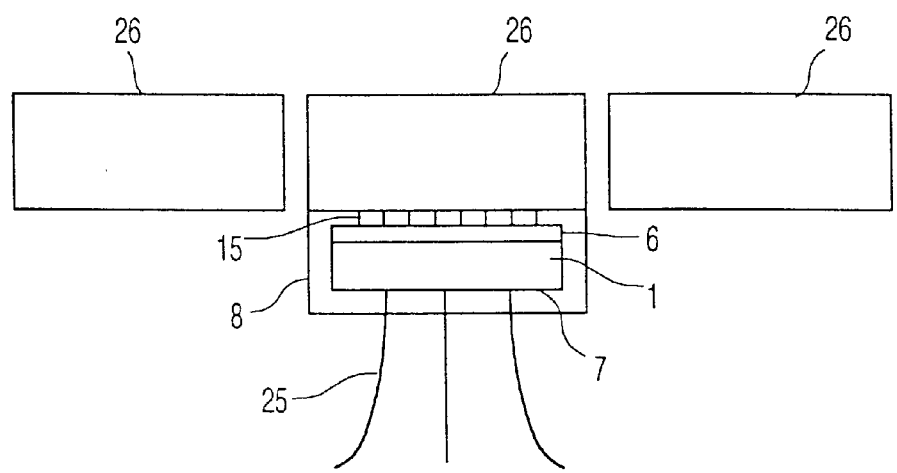

In the modification shown in FIG. 4b), the reading device comprises an electrode matrix consisting of a plurality of electrodes 26 all of which are also made of a conducting polymer. The problem of adjusting the reading pencil 9 with respect to the tag device can be electronically solved by such an electrode matrix. The electrode matrix has sufficiently large dimensions so that a placement of the tag device opposite the electrode matrix or vice versa can be realized by a user without great difficulty. A detection circuit can now determine for each electrode 26 consecutively by means of an electric measuring field whether there is a coupling with the electrode 6 on the upper side of the substrate body 1 of the tag device. The electrode 26 with the maximum coupling is then selected for transmitting the data signals or the power supply energy.

In a corresponding manner, an electronic adjustment may,also be performed for a tag device which supports at least two electrodes on the upper side of the substrate body 1, for example, a tag device as shown in FIG. 1a) or 1b).

Figure 1C:
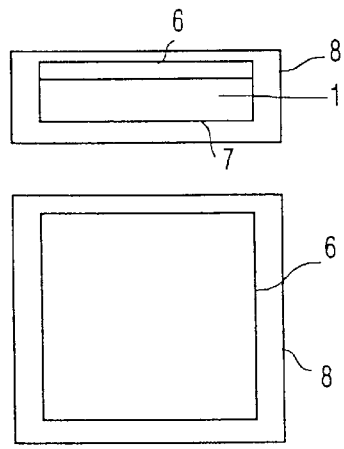
Figure 5:
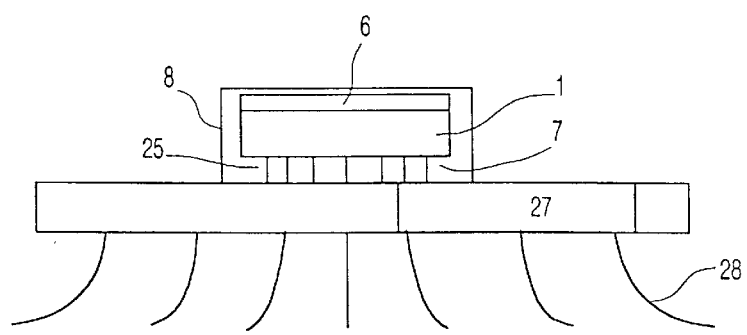
FIG. 5 shows an embodiment of an arrangement of an auxiliary electrode on a surface of the substrate body remote from the data-processing circuit.

FIG. 5 shows how a tag device in accordance with the embodiment of FIG. 1c) is provided on the surface of a conducting body 27, for example, on a metallic object. Due to the electric field 25, a close, capacitive coupling between the electrodes 7 on the rear side of the substrate body 1 and the conducting body 27 is established. The conducting body 27 thus takes over the function of an auxiliary electrode for the electrode 7. The protective coating 8 constitutes the dielectric between the conducting body 27 and the electrode 7. The conducting body 27 couples with mass via a field 28. The conducting body 27 thus functions as an increase of the coupling capacity in a corresponding manner as the auxiliary electrodes 18 and 19.

Figure 6A:
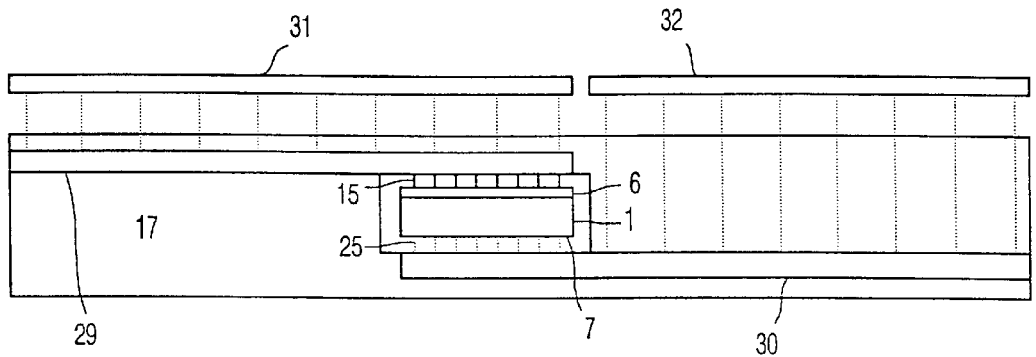
FIG. 6 shows an embodiment of the co-operation between the tag device and the reading apparatus when using electrodes arranged on both sides on the tag device, including auxiliary electrodes.

FIG. 6 shows some embodiments in which a substrate body 1 with an electrode 6 on its upper side and an electrode 7 on its lower side is accommodated in a two-layer metallized insulating material foil in such a way that both electrodes 6,7 on the substrate body 1 are coupled to auxiliary electrodes. In the embodiment shown in FIG. 6a), a metallization layer is provided as a first auxiliary electrode 29 in a first plane above the substrate body 1 and the electrode 6, and a second metallization layer is provided as a second auxiliary electrode 30 in a second plane below the substrate body 1 and the electrode 7. In its peripheral area, the first auxiliary electrode 29 completely covers the electrode 6 on the substrate body 1, whereas the second auxiliary electrode 30 completely covers the electrode 7 on the substrate body 1 in a corresponding manner. Preferably, there is no coverage outside the area of coverage of the auxiliary electrodes 29, 30 with the electrodes 6 and 7 on the substrate body 1. Capacitive couplings with correspondingly formed electrodes 31 and 32 of a reading apparatus can thereby be established between the auxiliary electrodes 29 and 30 from the upper side of the tag device, i.e. from the side on which the data-processing circuit is arranged on the substrate body 1.

A tag device as shown in FIG. 6a) is preferably suitable to be provided on nonmetallic objects when a larger coupling distance between the reading device and the tag device is desired.

Figure 6B:
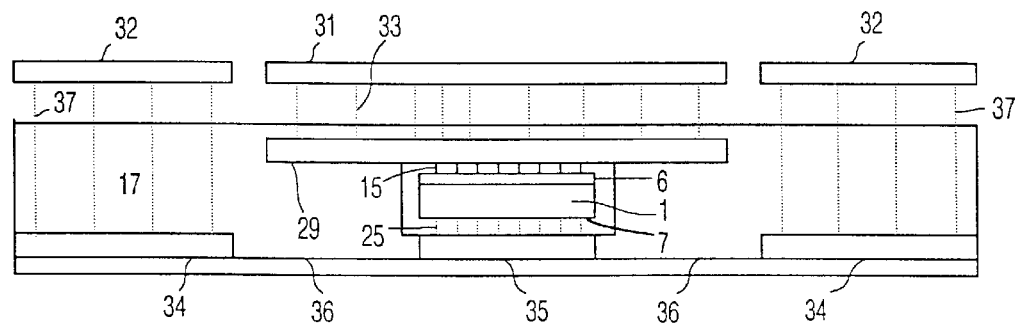

FIG. 6b) shows an embodiment of a tag device with the associated reading apparatus and its electrodes in the case of a concentric structure of the auxiliary electrodes and a two-sided electrode arrangement on the substrate body 1. The metallizations constituting the auxiliary electrodes are again arranged in two planes in the supporting body 17. An inner, concentric auxiliary electrode 29 is capacitively coupled via the electric field 15 with the electrode 6 on the upper side of the substrate body 1. This electrode couples with the reading apparatus via a congruent electrode 31. An electric field forming between the first auxiliary electrode 29 and the electrode 31 is denoted by the reference numeral 33.

An auxiliary electrode formed in two parts is arranged in the second plane of the metallization of the supporting body 17 and comprises an outer, essentially circular electrode surface 34 and an inner electrode surface 35. Outer and inner electrode surfaces 34, 35 are interconnected via connection conductors 36. The outer electrode surface 34 is arranged concentrically with respect to the first auxiliary electrode 29 and congruently with respect to a concentric electrode 32 of the reading apparatus. During operation, the electrode 31 of the reading apparatus couples with the first auxiliary electrode 29 and the further electrode 32 of the reading apparatus couples with the outer electrode surface 34 of the second auxiliary electrode of the tag device. The last-mentioned coupling is obtained via an electric field 37. The electrode 7 on the substrate body 1 couples via the electric field 25 with the inner electrode surface 35 of the second auxiliary electrode.

Figure 6C:
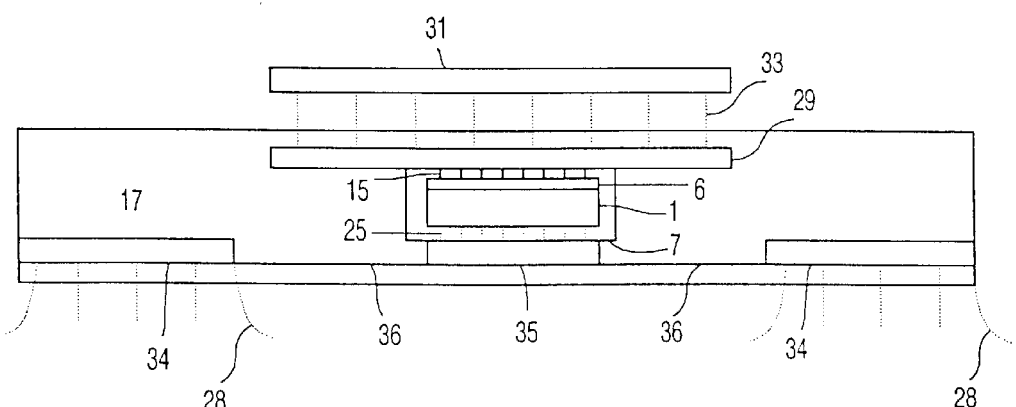

In the modification shown in FIG. 6c), and as against FIG. 6b), the coupling of the second auxiliary electrode with the outer electrode surface 34 via the electric field 28 is established by means of a ground potential which is formed in accordance with FIGS. 4 and 5. The electrode 32 of the reading apparatus is then replaced by this ambient ground so that the electrode arrangement of the reading apparatus can be simplified.

In a preferred embodiment, the supporting body 17 may be formed from two metallized partial foils which can be stuck together while interpositioning the substrate body 1. Such an arrangement can be easily manufactured.

Figure 7:
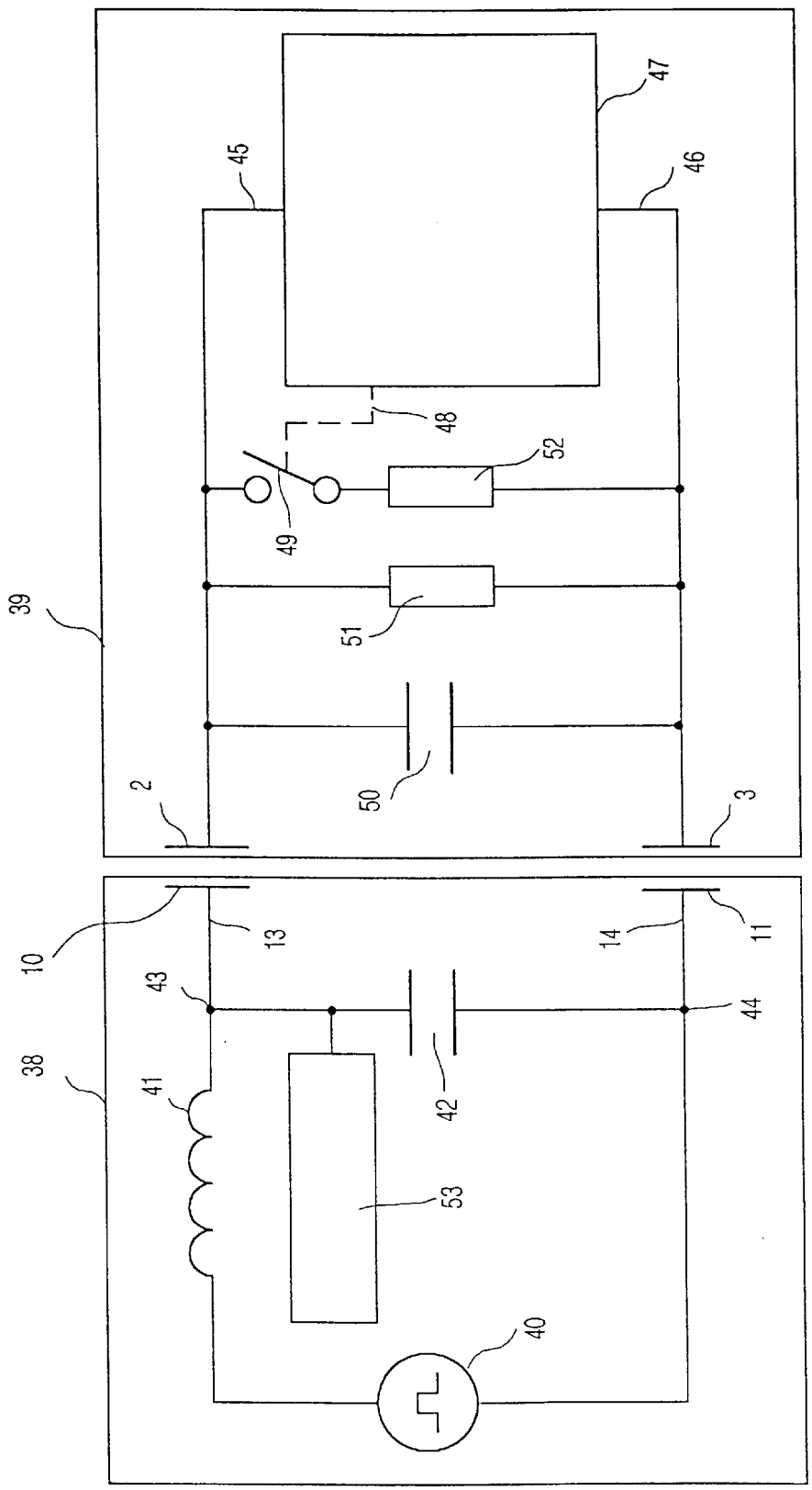
FIG. 7 is a block diagram of the electric circuit of a reading apparatus and a tag device in a first embodiment.

FIG. 7 shows a first embodiment for a block diagram of the co-operation between the reading apparatus 38 and the tag device 39. The reading apparatus 38 comprises a driver circuit 40 which supplies a square-wave voltage and applies it to a series resonant circuit consisting of a coil 41 and a capacitance 42. An electric voltage increased by resonance overshoot may then be taken from the terminals 43, 44 of the capacitance 42 and applied to the electrodes 10, 11 of the reading apparatus 38, which were selected by way of example in this case, via the electrode terminals 13 and 14, respectively.

In operation, the electrodes 10 and 11 of the reading apparatus 38 face the electrodes 2 and 3 of the tag device 39. Each of these is connected to a terminal 45 and 46, respectively, of the data-processing circuit 47 which is accommodated in the tag device 39.

Electric energy is thus coupled from the series resonant circuit 41, 42 into the data-processing circuit 47 via the capacitances 2, 10 and 3, 11.

The data-processing circuit 47 comprises circuit means for the power supply of the overall tag device 39 and preferably clock signal-prepared means, a modulation and a demodulation device, a control device, a memory and possibly an encryption device. These devices are used for generating a data signal which controls a switching device 49 via a line 48. This switching device is preferably formed with electronic circuit means. Between the terminals 45 and 46 of the data-processing circuit 47, the tag device 39 further comprises a parasitic capacitance 50, a first load resistor 51 and a series arrangement of the switching device 49 and a second load resistor 52. By optionally switching the switching device 49 on and off, the value of the parallel arrangement of the two load resistors 51, 52 can be modulated in accordance with the data signal on the line 48.

On the one hand, the power supply energy is derived from the oscillation supplied via the terminals 45, 46 in the data-processing circuit 47, and, on the other hand, a clock signal is prepared. The frequency of the square-wave oscillation supplied by the driver circuit 40 can be directly used as a clock signal, but a frequency gained therefrom by frequency division may also be used for this purpose. The data signal to be transmitted to the reading apparatus is then generated in a way which is predetermined for the tag device 49, which way is not an object of the present description, and this signal is supplied via the line 48 for activation of the switching device 49. The load, formed by the load resistors 51, 52, of the series resonant circuit 41, 42 is thus modulated in the clock of this data signal. The voltage modulation thereby occurring at the terminals 43, 44 is applied to a demodulator 53 in the reading apparatus 38, where it is evaluated. To this end, the demodulator 53 comprises the required electronic circuit means.

For transmitting data signals from the reading apparatus 38 to the tag device 39, the frequency or, preferably, the amplitude of the square-wave signal may be modulated in the driver circuit 40. This modulation is evaluated in a corresponding manner in the data-processing circuit 47.

The data-processing circuit 47 may comprise a non-volatile memory for permanent storage of data in the tag device 39. Moreover, the data-processing circuit 47 may comprise an encryption unit for encrypting the data signals from the tag device 39 to the reading apparatus 38. This is particularly significant for authentication processes between the reading apparatus 38 and the tag device 39.

Figure 8:
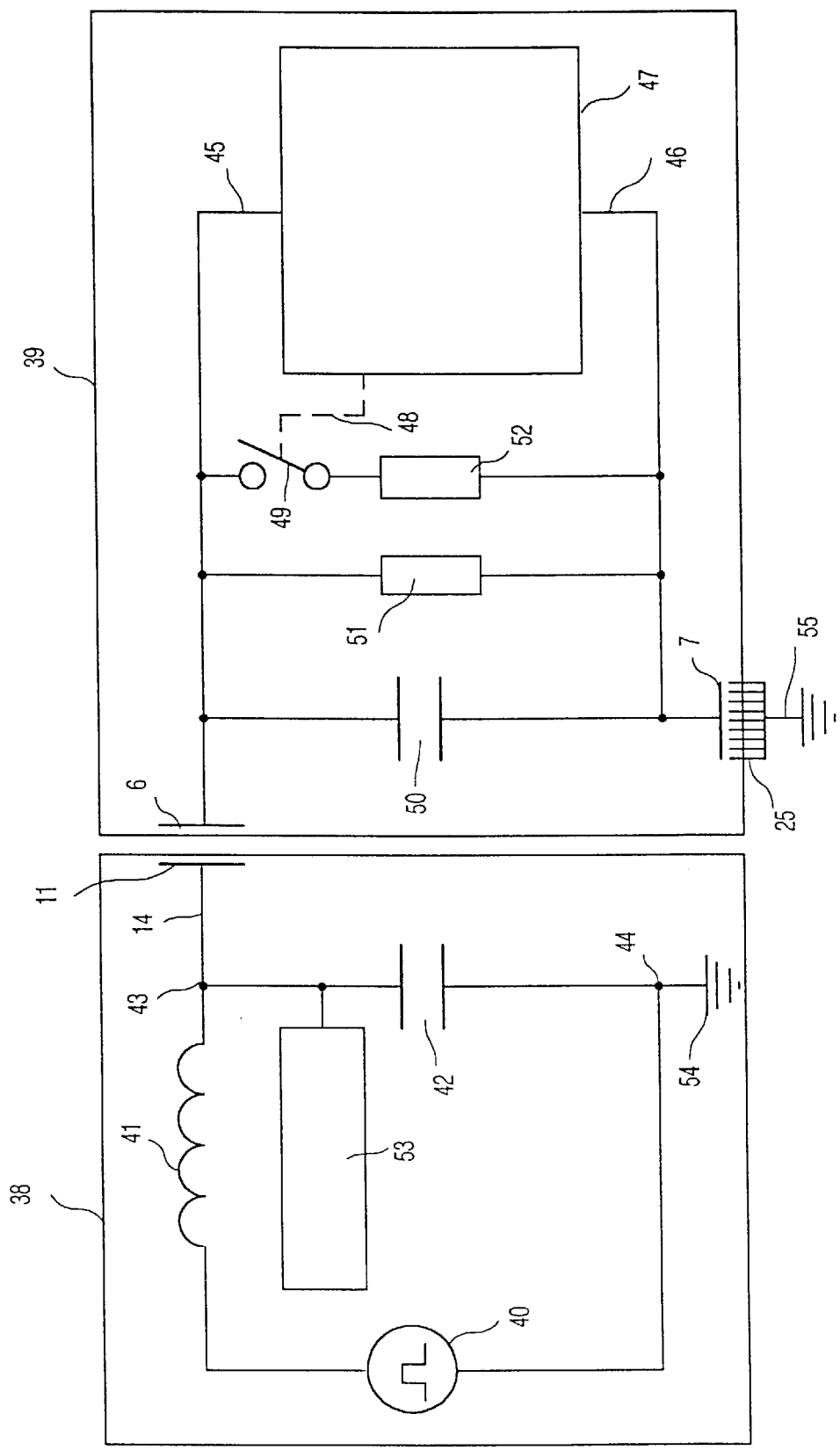
FIG. 8 shows a modification of the circuit arrangement shown in FIG. 7.

Whereas a direct capacitive coupling via two electrode pairs 2, 10 and 3, 11 is established between the tag device 39 and the reading apparatus 38 in FIG. 7, FIG. 8 shows a modification of such a circuit arrangement for the case where there is only a one-pole direct capacitive coupling, while the coupling of the second pole is established via ambient ground. To this end, the circuit arrangement of FIG. 7 is modified in such a way that it can be used, for example, with a configuration as shown in FIG. 4a). The terminal 43 of the capacitance 42 of the series resonant circuit of the reading apparatus is now connected via the electrode terminal 14 to the electrode 11 of the reading apparatus which is capacitively coupled to the electrode 6 on the upper side of the substrate body 1. The other terminal 44 of the capacitance 42 is connected ground 54. In the tag device 39, the electrode 6 is connected to the terminal 45 of the data-processing circuit 47. Now, the electrode 7 on the lower side, on the surface of the substrate body 1 remote from the data-processing circuit 47, is connected to the terminal 46 of the data-processing circuit 47. This electrode couples—via the electric field 25 in accordance with FIG. 4a)—with ambient ground 55, i.e. with all conducting objects in the ambience of the reading apparatus 38 to which also ground 54 is connected.

The other elements of FIG. 8 correspond to those in the circuit arrangement shown in FIG. 7.

The selection of the optimal carrier frequency of the driver circuit 40 is based on different parameters. A high value for the carrier frequency simplifies the implementation of the capacitive couplings between the tag device 39 and the reading apparatus 38 because the impedances of the capacitive couplings described thereby decrease. On the other hand, parasitic capacitances, particularly within the tag device 39, preferably of the data-processing circuit 47, gain a greater significance. However, since the tag device 39 according to the invention couples and co-operates with the reading apparatus 38 only within comparably short distances, legal prescriptions for limiting the amplitude of electromagnetic stray fields—electro-magnetic pollution—are not particularly significant for dimensioning the tag device according to the invention. They are thus hardly a limiting factor in the selection of the optimal carrier frequency.

The clock frequency for the data-processing circuit in the tag device influences its power consumption. Dependent on the spatial distance between the corresponding electrodes of the reading apparatus and the tag device during operation, and dependent on the selected carrier frequency, the latter itself may be selected as the clock frequency. If this is not optimal, a lower clock frequency may be generated from the carrier frequency by simple frequency division. The power consumption of the tag device can thereby also be decreased.

What is claimed is:

1. A tag device for receiving processing and/or transmitting data signals comprising:

an integrated electronic data-processing circuit formed in a substantially plane substrate body, wherein the data-processing circuit does not require energy storage, and energy and data exchange with a reading apparatus are realized only by capacitive coupling; and at least two electrodes arranged on the plane substrate body, the electrodes are connected to the data-processing circuit and adapted to enable transmission and/or reception of the data signals and/or electric power energy from the reading apparatus using offset currents via a low frequency, low voltage capacitive coupling with a quasi-state, electric alternating field.

2. A tag device as claimed in claim 1, wherein said at least two electrodes are arranged on that surface of the substrate body on which the data-processing circuit is formed.

3. A tag device as claimed in claim 1, wherein at least one of the electrodes is arranged on that surface of the substrate body on which the data-processing circuit is formed, and at least a further one of the electrodes is arranged on the substrate body surface facing said surface.

4. A tag device as claimed in claim 1, wherein a supporting body comprising at least an at least substantially plane auxiliary electrode on which the substrate body with the data-processing circuit is arranged in a position in which a capacitive coupling of each auxiliary electrode with substantially exclusively one of the electrodes on the substrate body is realized.

5. A tag device as claimed in claim 4, wherein each auxiliary electrode covers the substrate body at least substantially at the area of the electrode on the substrate body, which electrode capacitively couples with said auxiliary electrode.

6. A tag device as claimed in claim 1, wherein the substrate body with the electrodes arranged thereon and the data-processing circuit are arranged between auxiliary electrodes arranged in two planes.

7. A system using a tag device for receiving, processing and/or transmitting data signals comprising:

an integrated electronic data-processing circuit formed on a substantially plane substrate body;

at least two electrodes arranged on the plane substrate body of the tag device; and, a reading apparatus comprising electrodes corresponding to the electrodes of the tag device, wherein, in operation, the tag device is brought into a spatial correlation with the reading apparatus so that an exchange of electric power supply energy and/or the data signals takes place between the between the electrodes of the tag device and the corresponding electrodes of the reading apparatus using offset currents produced via a capacitive coupling with a quasi-static, electric alternating field, wherein the data-processing circuit does not require energy storage, and energy and data exchange with the reading apparatus are realized only by capacitive coupling, and wherein the electrodes of the tag device is built up with the capacitive coupling.

8. A system as claimed in claim 7, wherein the reading apparatus and the tag device are formed with mutually complementary, form-locking recesses for rapidly joining the reading apparatus and the tag device in the correct position.

9. A system as claimed in claim 7, wherein the reading apparatus comprises an electromagnetic resonant circuit and in that data signals are transmitted from the tag device to the reading apparatus by means of load modulation of an oscillation produced in the resonant circuit of the reading apparatus and coupled in the tag device via the quasi-static electric alternating field.

10. A system as claimed in claim 7, wherein the electrodes of the reading apparatus are formed substantially congruently with the corresponding electrodes of the tag device.

* * * * *